United States Patent [19]

Sato et al.

[11] Patent Number: 4,671,069
[45] Date of Patent: Jun. 9, 1987

[54] COMBUSTOR FOR GAS TURBINE

[75] Inventors: Isao Sato; Yoji Ishibashi; Zensuke Tamura; Takashi Ohmori; Yoshimitsu Minakawa, all of Hitachi; Hidekazu Fujimura, Mito; Yoshihiro Uchiyama, Hitachi, all of Japan

[73] Assignee: Hitachi, Ltd., Tokyo, Japan

[21] Appl. No.: 809,200

[22] Filed: Dec. 16, 1985

Related U.S. Application Data

[63] Continuation of Ser. No. 600,954, Apr. 16, 1984, abandoned, which is a continuation of Ser. No. 294,989, Aug. 21, 1981, abandoned.

[30] Foreign Application Priority Data

Aug. 25, 1980 [JP] Japan .................. 55-115991

[51] Int. Cl.<sup>4</sup> ............... F02C 1/00; F02G 3/00
[52] U.S. Cl. ........................ 60/737; 60/746; 60/748; 60/733
[58] Field of Search ............ 60/726, 733, 732, 737, 60/738, 746, 747, 39.06, 39.23, 39.826, 39.11, 748; 431/352

[56] References Cited

U.S. PATENT DOCUMENTS

| | | | |
|---|---|---|---|
| 2,812,637 | 11/1957 | Fox | 60/726 |
| 2,969,643 | 1/1961 | Mullen | 60/39.11 |
| 2,999,359 | 9/1961 | Murray | 60/737 |
| 3,581,493 | 6/1971 | Sweet et al. | 60/726 |
| 3,690,093 | 9/1972 | Carlisle | 60/726 |
| 3,958,413 | 5/1976 | Cornelius et al. | 60/737 |
| 4,006,589 | 2/1977 | Schirmer | 60/726 |
| 4,012,904 | 3/1977 | Nogle | 60/737 |
| 4,015,954 | 4/1977 | Reed | 60/39.11 |
| 4,052,844 | 10/1977 | Carvel et al. | 60/738 |
| 4,112,676 | 9/1978 | Decorso | 60/737 |
| 4,113,425 | 9/1978 | von Linde et al. | 60/755 |
| 4,253,301 | 3/1981 | Vogt | 60/746 |

FOREIGN PATENT DOCUMENTS 1932881 11/1977 Fed. Rep. of Germany ........ 60/737

Primary Examiner—Louis J. Casaregola
Assistant Examiner—Donald E. Stout
Attorney, Agent, or Firm—Antonelli, Terry & Wands

[57] ABSTRACT

A premixture of compressed air and gaseous fuel is supplied and conbusted into a head combustion chamber of a combustor for gas turbine and main combustion of lean, low flame temperature is carried out in a rear combustion chamber following the heat combustion chamber to prevent the formation of high flame temperature which tends to promote NOx generation.

7 Claims, 9 Drawing Figures

COMBUSTOR FOR GAS TURBINE

This is a continuation of application Ser. No. 600,954, filed Apr. 16, 1984, now abandoned, which in turn is a continuation of application Ser. No. 294,989 filed Aug. 21, 1981 and now abandoned.

BACKGROUND OF THE INVENTION

The present invention relates to a combustion method and a combustor for gas turbine and, more particularly, to a combustion method and a combustor for reducing emission of nitrogen oxides (referred to as NOx, hereinafter) when LNG (Liquefied Natural Gas) or the similar gaseous fuel such as coal gas is used.

The NOx and carbon monoxide (referred to as CO, hereinafter) contained by the exhaust gas emitted from a gas turbine are inherently noxious, and constitute one of the causes of air pollution and photochemical smog. Recently, there is an increasing demand for NOx reduction to prevent destruction of natural environment. This demand is severe particularly from the social point of view. In order to fully meet the regulation, it is necessary to reduce the level of NOx down to about 1/10 or less than the present level.

In general, it is said that the NOx is generated in a high flame temperature region in a combustor and that the generation of NOx can effectively be reduced by lowering the flame temperature.

It has been proposed that a gas turbine, into which excess air is supplied; is adapted to make a combustion at a low temperature, thanks to the supply of a part of the excess air to the high flame temperature region. This type of combustion method is usually referred to as low-temperature lean-mixture combustion. This conventional low-temperature lean-mixture combustion, however, cannot provide remarkable reduction of NOx emission to such a level as to meet the present strict regulation, for the reasons described hereinafter.

In the low-temperature and lean-mixture combustion, although excess air is supplied, there must be region where optimum combustion is carried out to give a high flame temperature, consequently, NOx is inevitably generated in such high flame temperature region.

Increased supply of the excess air for the reduction of NOx will produce an excessively cooled area, so that CO and other unburnt substance will be increased undesirably, although a further reduction of NOx may be achieved. In the worst case, the supply of excessive air may cause a discontinuation of flame or misfire.

U.S. Pat. No. 4,058,977 proposes a low NOx emission combustor of swirl type chambers by subjecting the air passing through the engine to NOx producing elevated temperatures for minimal periods of time and by establishing a controlled ignition lag so as to permit molecular premixing between the so-called vitiated swirling, prevaporized fuel-air mixture and swirling combustion air to establish controlled autoignition so as to produce high-rate, lean burning in the primary combustion chamber, where the term "vitiated" is used in describing a fuel and air mixture, where the oxygen available for combustion in the air or mixture is less than the normal 21%, that is, a mixture of reduced oxygen content. The aforementioned patent relates to a pilot burner structure based on the combustion of vitiated mixture of vaporized liquid fuel and air to use the combustion product from the burner for flash vaporization of fuel droplets so as to effect ignition lag until supplemental swirling combustion air can be introduced to increase the oxygen content. That is, the Patent is directed to low NOx emission from liquid fuel, and not directed to the use of gaseous fuel.

SUMMARY OF THE INVENTION

An object of the present invention is to provide a combustion method and a combustor for gas turbines, wherein a premixture of compressed air and gaseous fuel is supplied into a head portion of the combustor to prevent the formation of high flame temperature which tends to promote NOx generation.

The present invention is based upon a recognition that a larger reduction of NOx can be achieved by diluted combustion in so-called pre-mixing type combustion in which the combustion takes place after a pre-mixing of fuel and air, than the so-called diffusion mixing type combustion in which the mixing of air and fuel and combustion are achieved in a combustion chamber. More specifically, according to the invention, a stable pre-mixed combustion flame is formed in the region of high temperature combustion taking place at the central portion of the combustor to suppress the generation of NOx while forming a stable flame, thereby enabling a realization a low-temperature lean-mixture combustion with reduced generation of NOx.

PREFERRED EMBODIMENTS OF THE INVENTION

Figure 1:
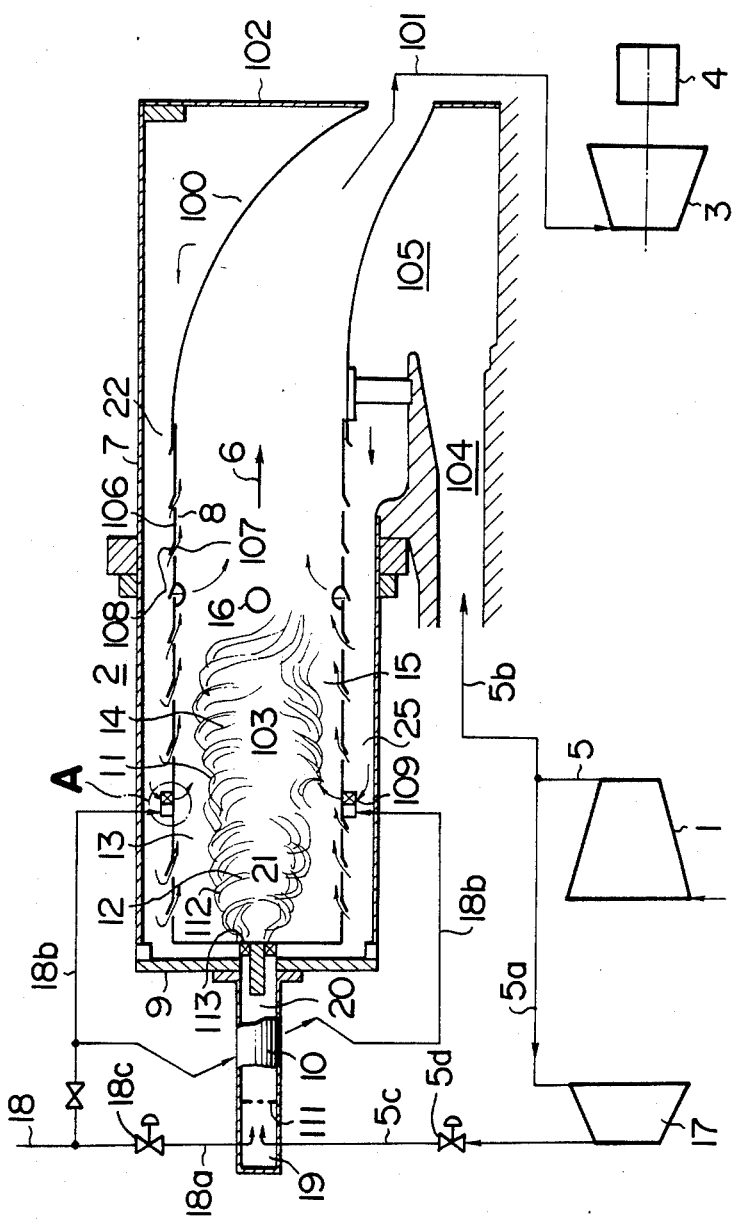
FIGS. 1 and 7 are schematic illustrations of combustors constructed in accordance with different embodiments of the invention.

In FIG. 1, a gas turbine is composed of compressor 1, combustor 2, turbine 3 and load portion 4 as the major constituents. Compressed air 5a and 5b delivered by compressor 1 are introduced into combustor 2.

Air 5b from compressor 1 is passed through diffuser part 104 and then introduced into reservoir tank 105, and passed along transition piece 100 and through annular space between an outer cylinder 7 and an inner cylinder 8 of the combustor 2, and introduced into the combustor 2 through open louvers at the wall of inner cylinder 8 for forming cooling air stream 107, through swirl air ports 109 for combustion, and through dilution air ports 16.

On the other hand, combustion gas 6, generated within combustor 2, is passed through transition piece 100 as flow-rectified gas stream 101 and supplied to turbine 3 for working. Combustor 2, which is the source of generation of NOx and CO, is constituted by the outer cylinder 7, inner cylinder 8, mounted in outer cylinder 7, end cover 9 mounted to close one end of outer cylinder 7, and fuel nozzle 10 attached to end cover 9.

Fuel nozzle 10, for injecting gaseous fuel premixed with air into the combustor 2 is comprised of a premixing chamber 19 for mixing gaseous fuel 18a with air 5c, a resistance perforated plate 111, for promoting the mixing effect and preventing back fire of flame, and a swirler 113 for making the resulting pre-mixture of gaseous fuel 18 and compressed air 5c in swirling stream 112, as will described later in detail.

Combustion chamber 11, defined in inner cylinder 8, has head combustion chamber 13 in which pre-mixing combustion is achieved to form a stable pre-mixing flame 12, rear combustion chamber 15 to which a gaseous fuel 18b and compressed air 5b are concurrently supplied to attain main combustion of lean low-temperature flame 14, and a dilution region defined at the downstream side of rear combustion chamber 15 and adapted to cool the combustion gas down to a predetermined temperature while achieving uniformity of the combustion gas temperature.

The dilution air ports 16 are formed in the dilution region, and compressed air 5a, discharged from compressor 1 is further compressed by a recompressor 17 to form compressed air 5c of higher pressure. The compressed air 5c is introduced compressed together with part 18a of the gaseous fuel 18, into the pre-mixing chamber 19 to form pre-mixture gas 20 at an air excess ratio ($\lambda$) in the gaseous fuel 18a with compressed air 5c of between 1.2 and 1.4 by weight. The flow rate of the air 5c is controlled by control valve 5d and the flow rate of the gaseous fuel 18a is controlled by control valve 18c as shown in FIG. 1. This pre-mixture gas 20 is supplied into head combustion chamber 13. In the rated operation of the gas turbine, about ¼ to ⅓ of the total gaseous fuel 18 is contained by this pre-mixture gas which is introduced into head combustion chamber 13. Since the pre-mixture gas 20 has a good combustibility, there is a large possibility of burning in head combustion chamber 13, so that the flow velocity in the supply system is accelerated to prevent the reverse propagation of flame from the combustion chamber 13, i.e. so-called back fire.

To this end, it is necessary that the velocity of the pre-mixture gas 20 flowing out of fuel nozzle 10 is greater than the combustion speed of the flame. As a measure for creating such a condition, the compressed air 5a is further compressed to a higher pressure to flow into head combustion chamber 13 at a high flow velocity. The injection pressure of the pre-mixture gas 20 is set to be at least 1.5 times as high as the pressure in the inner cylinder of the combustor 2, and the injection velocity thereof is at least 100 m/sec at that time. Introduction of the mixture into the combustion chamber 13 is made after a sufficient mixing of gaseous fuel 18a and compressed air 5c in the premixing chamber 19. By recompression of part of the compressed air 5a, the back fire is prevented irrespective of pressure change in the axial direction of combustor 2 to create a stable flame, for the following reasons.

Combustion gas 6 flows from head combustion chamber 13 toward rear combustion chamber 15. Thus, the pressure is higher in head combustion chamber 13, and is gradually decreased toward the downstream side. On the other hand, the pressure in annular space 22 between outer and inner cylinders 7 and 8 is gradually decreased toward the head portion of the combustion chamber 13 due to friction loss and loss of energy due to presence of resistance. Consequently, the pressure in the inner cylinder 8 is gradually increased toward the head portion, while the pressure in annular space 22 is gradually decreased toward the head portion, so that the flow velocity of the air is decreased to make it extremely difficult to supply the air at desired flow rate. In addition, the increased flow velocity undesirably increases the pressure drop in the combustor 2. According to the invention, however, only part of the compressed air 5a is further compressed to increase the flow velocity to avoid the propagation of the flame to pre-mixing chamber 19, i.e. the back fire, so that the flame can be stably maintained independently of change in the state of combustion in rear combustion chamber 15. It is, therefore, possible to form a stable flame of pre-mixture having reduced generation of NOx in head combustion chamber 13.

Figure 3:
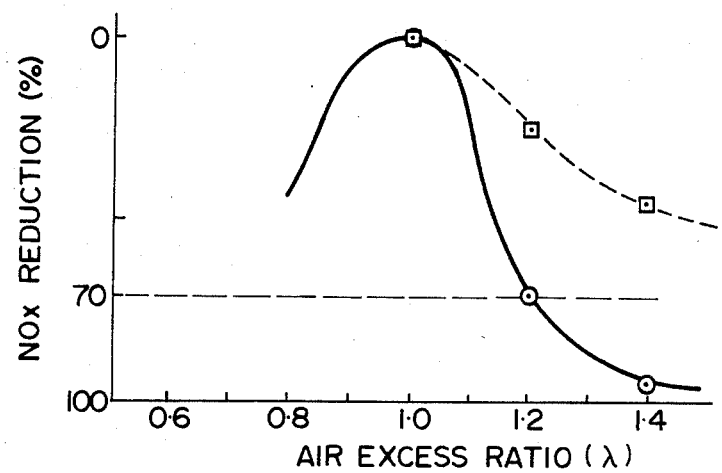
FIG. 3 is a characteristic chart showing the reduction of NOx in relation to the air excess ratio of pre-mixture.

FIG. 3 shows the relationship between the air excess ratio of the pre-mixture and NOx reduction. As will be seen from FIG. 3, it is possible to obtain a NOx reduction ratio over 70% if the air excess ratio ($\lambda$) is at least 1.2, as plotted by full line.

In FIG. 3, the result without premixing of gaseous fuel 18 and the compressed air 5c, i.e. that of diffusion combustion of the same gaseous fuel is plotted by dotted line. In the air excess ratio ($\lambda$) of 1.2, it has been experimentally confirmed that NOx reduction by diffusion combustion is about one-half of that by premixed fuel combustion. That is, the premixed fuel combustion is much more effective for low NOx emission, and NOx reduction over 70% cannot be attained by the diffusion combustion.

Figure 2:
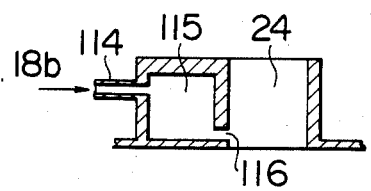
FIG. 2 is an enlarged view of the portion marked at A in the embodiment shown in FIG. 1.
Figure 9:
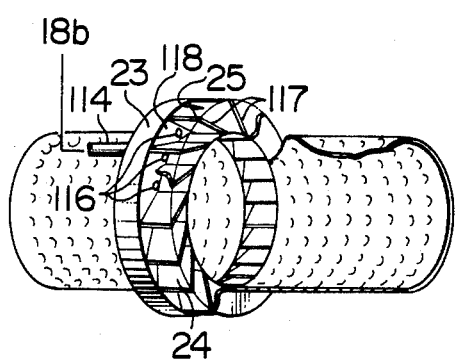
FIG. 9 is an enlarged view of swirling air port.

At the side portion of rear combustion chamber 15, disposed are a plurality of fuel discharge ports 116 and swirling air ports f24, as shown in FIG. 2 and FIG. 9.

In FIG. 2 and FIG. 9, gaseous fuel 18b to rear combustion chamber 15 is introduced at first to fuel reservoir 115 through fuel supply pipe 114. Fuel reservoir 115 is provided with a plurality of fuel discharge ports 116, which allow gaseous fuel 18b to be discharged into passages 24 of swirling air 25, surrounded by swirling air vanes 117. Fuel discharge ports 116 are open to oppose to the swirling air ports so as to supply gaseous fuel 18b into air stream 25 passing through air ports 24 to form a mixture which is then charged into rear combustion chamber 15. The flow rates of compressed air 5b and gaseous fuel 18b are so determined as to provide an air excess ratio ($\lambda$) of 1.5 to 1.6 in the rated operation of the gas turbine. Thus, the air excess ratio is further increased in the partial load operation of the gas turbine, but the unstable combustion during the partial load operation is avoided thanks to the flame formed as a result of combustion of the pre-mixture in head combustion chamber 13.

In order to further decrease NOx, it is preferred to effect the pre-mixture combustion not only in head combustion chamber 13, but also in rear combustion chamber 15. However, this may cause back fire if the pre-mixture catches the fire before coming into the combustion chamber 13, so that the combustion in the rear combustion chamber 15 is made in the form of diffusion mixing combustion. In the described embodiment, however, swirling air ports 24 are arranged opposite to one another, and gaseous fuel 18b is supplied through the swirling air ports 24 so that gaseous fuel 18b and compressed air 5b can be previously mixed to some extent to achieve NOx reduction.

Figure 4:
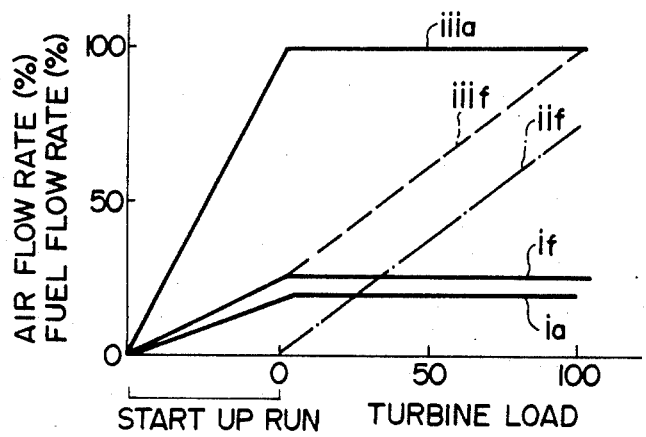
FIG. 4 is an illustration of fuel control adopted in the operation of the combustor in accordance with the invention.

The air excess ratio (λ) in the mixture of gaseous fuel 18b and compressed air 5b in the rated operation of the gas turbine preferably falls between 1.5 and 1.6, so that combustion is effected in a lean state to achieve a remarkable NOx reduction. About 66 to 75% of total fuel is supplied for the combustion in the rear combustion chamber 15, as will be seen from FIG. 4. In FIG. 4, symbol if represents the flow rate of fuel supplied to the head combustion chamber 13, iif represents the flow rate of fuel supplied to the rear combustion chamber 15 and iiif represents the total flow rate of fuel.

Symbol $i_a$ represents the flow rate of air for premixing and iiia represents the flow rate of total air. The flow rate of air will be constant above 0% load, while the flow rate of air for premixing is changed in a manner proportional to a change in the flow rate of gaseous fuel in the head combustion chamber 13 during the startup run. The combustion condition in the rear combustion chamber 15 is that in the rated operation of the gas turbine, the air excess ratio falls between 1.5 and 1.6. This air excess ratio, however, is increased in the partial load operation. However, a stable combustion is maintained in rear combustion chamber 15, thanks to the stable flame formed as a result of constant combustion in head combustion chamber 13.

Figure 5:
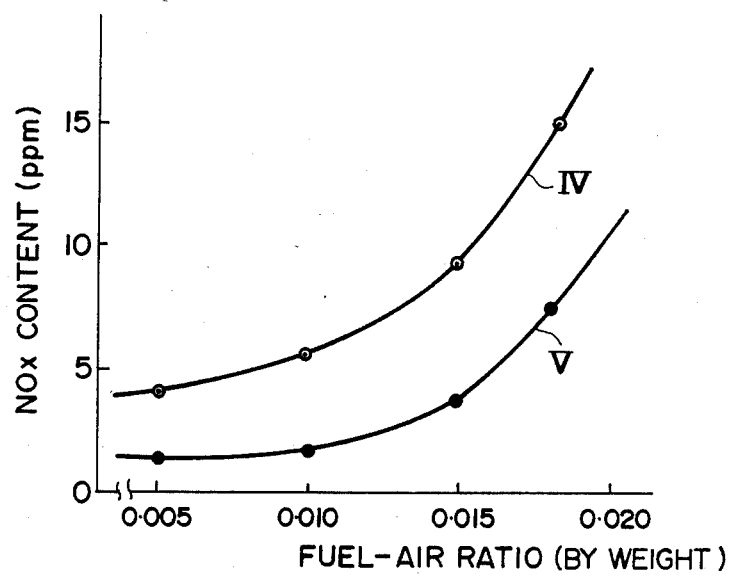
FIG. 5 shows the relationship between the air-fuel ratio and NOx reduction achieved in the combustor of the invention, in comparison with that attained in a prior art combustor.

FIG. 5 shows how the present invention is superior to the prior art based on diffusion combustion in the effect upon NOx reduction. In FIG. 5, the tendency of combustion according to the prior art and that of the invention are respectively represented by the curves IV and V.

Figure 6:
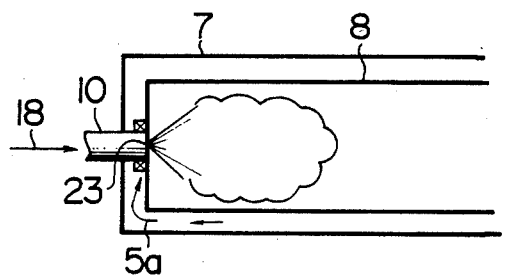
FIG. 6 is a schematic illustration of the prior art combustor.

The prior art combustor used for the comparison is the so-called diffusion mixing type combustor having only one fuel discharge port, adapted to perform lean and low-temperature combustion for NOx reduction, as shown in FIG. 6. In the prior art combustor, however, it is necessary to maintain an air excess ratio at a level between 1.3 and 1.5 in the combustion zone during the rated operation in order to maintain a stable flame over a wide range of load from no load to rated load. If an air flow rate is increased to further reduce NOx emission, undesirable phenomena such as CO generation and other unburnt substances, misfiring and so forth appear.

In contrast to the above, in the combustor of the invention, it is possible to attain combustion at an increased air excess ratio in rear combustion chamber 15, thanks to the stable flame formed in head combustion chamber 13, to achieve a remarkable NOx reduction, as will be seen also from FIG. 5.

In addition, since the flame in head combustion chamber 13 is the pre-mixture flame and the combustion temperature is relatively low, i.e. 1,600°–1,800° C., it is possible to suppress NOx generation in the core part of the combustor in which NOx generation is remakable in the prior art combustor.

Figure 7:
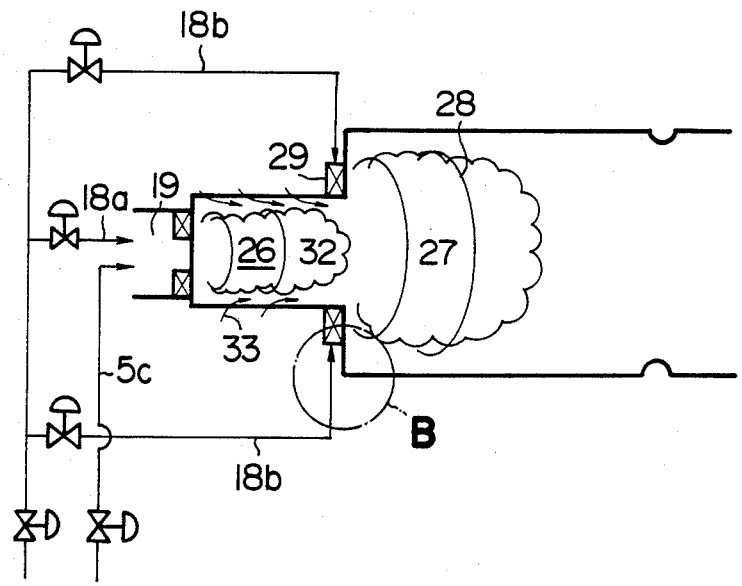
Figure 8:
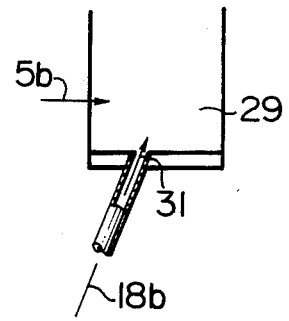
FIG. 8 is an enlarged view of the portion marked at B in FIG. 7.

As shown in FIGS. 7 and 8, a head combustion chamber 26 has a diameter smaller than that of rear combustion chamber 27. Swirler 29, for supplying air in the form of swirl, is disposed at the juncture between head combustion chamber 26 and rear combustion chamber 27. A fuel discharge port 31 is open in air passage 30 of swirler 29. Pre-mixing chamber 19 in connected to the upstream side end (left-side end as viewed in FIG. 7) of head combustion chamber 26 having a reduced diameter.

In the combustor of the embodiment of FIG. 7, the pre-mixing of compressed air 5b and gaseous fuel 18b is promoted in swirler 29. In addition, since the diameter of head chamber 26 is reduced, it is possible to form and maintain a stable pre-mixture flame in head chamber 26 without being affected by the flame formed in rear combustion chamber 27. In head combustion chamber 26, combustion takes place at an air excess ratio of between 1.2 and 1.4, so that combustion temperature is generally in a range between 1,600° and 1,800° C. and the temperature of the metal wall becomes higher. However, in the embodiment of FIG. 7, the metal surface area is small and, consequently, the heat transfer surface is also small. Consequently, the air flow rate for cooling the metal wall can be decreased, which, in turn, permits the air for combustion and dilution to be increased advantageously without causing any problem.

As has been described, according to the present invention, a pre-mixture of compressed air and gaseous fuel is supplied to the head portion of the combustor therevy to effectively prevent formation of high-temperature flame surface which tends to promote NOx generation in the combustion chamber. Consequently, the invention offers a great advantage of remarkable NOx reduction.

What is claimed is:

1. A combustor for a gas turbine comprising a combustion chamber means, means disposed outside of said combustion chamber means for mixing compressed air with a gaseous fuel to form a pre-mixture at a predetermined air excess ratio, means for supplying the pre-mixture into the combustion chamber means from an upstream end thereof to form a pre-mixture flame, means for supplying further gaseous fuel for main combustion together with air at an air excess ratio of 1.3 or more to a region near a tip end of the pre-mixture flame so as to enable a carrying out of a low temperature combustion of a lean mixture, the gaseous fuel to the main combustion chamber being increased in accordance with a gas turbine load, the combustion chamber means includes a head combustion chamber means for pre-mixing combustion to form the pre-mixture flame, a rear combustion chamber means for a main combustion of a lean low temperature flame, a dilution region for cooling combustion gas arranged downstream of an upstream end of the combustion chamber means, an inner cylinder defining a portion of the combustion chamber means with a plurality of louvers for supplying air for the main combustion and dilution, an outer cylinder surrounding the inner cylinder to form a passage for air between the outer cylinder and the inner cylinder of the louvers, an end cover closing one end of the outer cylinder, the means for supplying the pre-mixture includes a supply nozzle for supplying the pre-mixture of gaseous fuels with compressed air, the supply nozzle extending through the end cover and opening into the head combustion chamber means, the means for supplying further gaseous fuel includes a plurality of fuel discharge ports and swirling air ports disposed at the side of the rear combustion chamber means, a plurality of air ports are disposed at the side of the dilution region for enabling a cooling of the combustion gas, the head combustion chamber means has a smaller diameter than the rear combustion chamber means, the fuel discharge ports and swirling air ports are disposed at a junction of the head combustion chamber and the rear combustion chamber means, wherein means are provided for controlling a flow rate of air and a flow rate of fuel to the means for mixing air and gaseous fuel to form the pre-mixture so that a predetermined air excess ratio of said pre-mixture of between 1.2 and 1.4, can be maintained during the start up run and load operation of the gas turbine with the flow rate of the compressed air and the flow rate of the gaseous fuel for forming the pre-mixture being maintained substantially constant during the stationary operation of the gas turbine other than the start-up; and including means for increasing the pressure of the compressed air supplied to the means for mixing as compared to the pressure of the air supplied for main combustion.

2. A combustor according to claim 1, wherein said means for supplying the pre-mixture is adapted to supply the pre-mixture to the combustion chamber means at a pressure of at least 1.5 times a pressure in the combustion chamber means and at an injection velocity of at least 100 m/s.

3. A combustor according to claim 1, wherein the predetermined air excess ratio is at least 1.3.

4. A combustor according to claim 1, wherein the supply nozzle for a premixture of gaseous fuel with compressed air is comprised of a premixing chamber for mixing the gaseous fuel with compressed air, a resistance perforated plate and a swirler arranged in a direction from upstream side downwards and directed to supplying a premixture of the gaseous fuel with compressed air to the head combustion chamber.

5. A combustor according to claim 1, wherein the fuel discharge ports and the swirling air ports are formed as an integrated structure of a fuel reservoir connected to a fuel supply, fuel discharge ports, and passage means through which swirling air is directed from swirling air vanes surrounding the passage means.

6. A combustor for gas turbine comprising an inner cylinder defining a combustion chamber, an outer cylinder surrounding the inner cylinder to form a passage of air for combustion and dilution between the outer cylinder and the inner cylinder, an end cover closing one end of the outer cylinder, nozzle means for mixing compressed air with a gaseous fuel to form a pre-mixture at a predetermined air excess ratio, said nozzle means including a premixing chamber outside of the combustion chamber for forming the pre-mixture and said nozzle means extending through the end cover and being open to the inner cylinder for supplying the pre-mixture to the combustion chamber, and a swirler means for combustion air supply provided at a downstream side of the nozzle and in a direction of an inner circumference of the inner cylinder, the swirler means being connected to a supply pipe for a gaseous fuel, thereby discharging the gaseous fuel into the inner cylinder together with the air at an air excess ratio of 1.3 or more, the amount of fuel discharged into the inner cylinder being increased in accordance with a gas turbine load, wherein means are provided for controlling a flow rate of air and a flow rate of fuel to the nozzle means so that a predetermined air excess ratio of said pre-mixture of between 1.2 and 1.4 can be maintained during the start up run and load operation of the gas turbine with the flow rate of the compressed air and the flow rate of the gaseous fuel for forming the pre-mixture being maintained substantially constant during the stationary operation of the gas turbine other than the start-up, and including means for increasing the pressure of the compressed air supplied to the means for mixing as compared to the pressure of the air discharged by said swirler means.

7. A combustor according to claim 6, wherein said swirler means is disposed about a periphery of the combustion chamber so tht the gaseous fuel is supplied in a swirling state about a periphery of the inner cylinder.

* * * * *